United States Patent [19]

Stewart

[11] Patent Number: 4,722,583
[45] Date of Patent: Feb. 2, 1988

[54] MODULATORS

[75] Inventor: William J. Stewart, Blakesley, England

[73] Assignee: Plessey Overseas Limited, Ilford, England

[21] Appl. No.: 813,292

[22] Filed: Dec. 24, 1985

[51] Int. Cl.$^4$ .................................................. G02B 6/36
[52] U.S. Cl. .................................. 350/96.15; 350/96.13
[58] Field of Search ................ 350/96.15, 96.12, 96.13

[56] References Cited

U.S. PATENT DOCUMENTS

| | | | |
|---|---|---|---|
| 3,923,373 | 12/1975 | Dabby et al. | 350/96.12 |
| 4,021,097 | 5/1977 | McMahon | 350/96.12 |
| 4,184,738 | 1/1980 | Wright | 350/96.15 X |
| 4,334,774 | 6/1982 | Glass et al. | 350/96.12 X |
| 4,386,822 | 6/1983 | Bergh | 350/96.15 |
| 4,447,116 | 5/1984 | King et al. | 350/96.12 X |

FOREIGN PATENT DOCUMENTS 1437067 8/1974 United Kingdom .
1559187 12/1976 United Kingdom .

OTHER PUBLICATIONS

IEEE Transactions on Circuits & Systems, vol. CAS-26, No. 12, Dec. 1979, pp. 1099-1108, by Schmidt and Alferness.

*Primary Examiner*—William L. Sikes
*Assistant Examiner*—Akm E. Ullah
*Attorney, Agent, or Firm*—Michael F. Oglo; Julian C. Renfro

[57] ABSTRACT

A fibre optic modulator comprises an optical fibre 2 and a waveguide 10 of active material. The waveguide 10 is dimensioned such that any mode of the waveguide has a propogation constant which is separated from the propogation constant of the optical fibre mode by an amount equal to or greater than $\lambda/L$ where $\lambda$ is the wavelength of transmitted electromagnetic radiation in the mode of the optical fibre and L is the length of the effective portion of the waveguide of active material.

10 Claims, 7 Drawing Figures

MODULATORS

The present invention relates to improvements in or relating to modulators and in particular, to electro-optic modulators.

An ever increasing number of communications systems utilise an optical fibre as the communications link. The optical fibre is used to convey electromagnetic radiation which may be light generated from a laser source. With such systems devices for modulating the laser light at very high speeds are necessary. One form of modulator which can be adopted at these high speeds is an electro-optic modulator which utilises the reactive interaction of light with an applied electric field through the electro-optic effect.

Several types of electro-optic modulator have been proposed previously. One type of modulator is the bulk electro-optic modulator and comprises a block of active material that exhibits the electro-optic effect to which a pair of electrodes is attached. When a voltage, such as a signal stream, is applied to the electrodes an electric field is created within the active material which causes a change in the refractive index of the material. Light passing through the material will experience a phase change in accordance with the applied signal. It can be seen, therefore, that the modulation of the light beam is an indication of the signal applied to the electrodes. Such devices, however, have certain disadvantages; a relatively high electrical power source is necessary to drive them and a high intrinsic electrical capacitance makes then unsuitable for very fast operation.

Another type of previously proposed modulator is the integrated optic waveguide modulator. In this device a waveguide is formed as a relatively narrow and shallow channel in a bulk crystal. Typically, the waveguide has cross sectional dimensions of the order of a few micrometers, typically 2 to 10 $\mu$m, and a length of up to a few centimeters. A pair of electrodes are provided on the surface of the bulk crystal, one disposed on either side of the waveguide to which a voltage may be applied to produce an electric field across the waveguide. The material for the waveguide is chosen to have a refractive index slightly higher than that of the bulk crystal so as to contain a propagating light wave within the waveguide. Such devices require much less power than is required to drive the previously described bulk devices but propagation losses are usually large fractions of a dB. Most of these losses occur at the interface with the optical fibre forming the transmission line and are due to the limited compatability of the waveguide with the optical fibre.

It is an object of the present invention to provide a modulator which has lower propagation losses than known devices and can be driven by relatively low electrical power sources.

Accordingly, there is provided a modulator for electromagnetic radiation, the modulator comprising an optical fibre for conveying electromagnetic radiation and a waveguide of active material, responsive to an applied field for modulating electromagnetic radiation in the active material in optical communication with the optical fibre and dimensioned such that any mode of the waveguide of active material has a propogation constant separated from that of the optical fibre mode by an amount equal to or greater than $\lambda/L$ where $\lambda$ is the wavelength of the electro-magnetic radiation in the mode of the optical fibre and L is the length of the effective portion of the waveguide of active material.

In accordance with one aspect of the present invention the waveguide comprises a stripe of the active material, the longitudinal axis of the waveguide being substantially parallel to that of the optical fibre.

According to another aspect of the present invention the waveguide comprises a slab of the active material.

Preferably the waveguide of active material is provided with a backing medium, the backing medium having a refractive index lower than that of the fibre.

The backing medium may comprise air.

The backing medium may comprise a metal layer.

The dimensions of the waveguide of active material in combination with the refractive index of the backing medium may be arranged such that there is no mode in the waveguide of active material.

The active material may comprise lithium niobate.

The active material may comprise Lanthanum doped lead zirconate titanate (PLZT).

The modulator may include a pair of electrodes for providing an electric field within the waveguide of active material.

The present invention will now be described, by way of example, with reference to the accompanying drawings in which.

Figure 1:
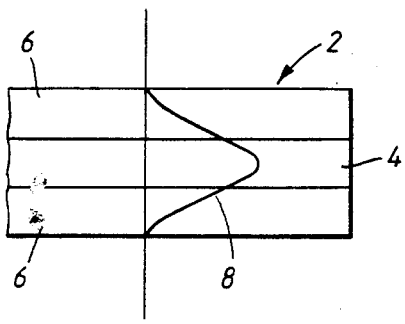
FIG. 1 illustrates a typical optical field profile for a monomode optical fibre.

Referring to the drawings an optical fibre 2 comprises a core 4 provided with a layer of cladding 6. Such a fibre has, typically, an optical field profile as shown by the line 8. The tails of the optical field within the cladding 6 are normally insignificant when the fibre is used as a communication link. In order to alleviate the interface problems referred to previously with respect to the integrated optic waveguide modulators it is advantageous if the waveguide, formed from an active material which can exhibit the electro optic effect, is incorporated in the tails of the optical field 8. Such a device is sometimes known as a "Device with External Active Medium"; DEAM. To fabricate a DEAM a tail of the optical field 8 may be enhanced either by removing a substantial proportion of the cladding 6 to expose or nearly expose a section of the core 4, such as by polishing, or by tapering the optical fibre. The active material which is to form the waveguide is then deposited in the region where the cladding 6 has been removed or reduced such that the waveguide lies in a tail of the optical field 8 of the optical fibre 2. Devices of this kind have a serious drawback in that the refractive indicies of available active materials are, generally, high when compared to the refractive indicies of the materials used to form the core 4 of the optical fibre 2. Thus the application of a block or film of active material to the optical fibre results in a proportion of the radiation being transmitted along the optical fibre 2 radiating into the waveguide of active material, causing losses which may be so severe as to prevent the operation of the device.

These losses may be reduced by the use of higher refractive index optical fibres in combination with the use of lower refractive index active materials for the waveguide. The losses, however, remain relatively high in view of the materials available.

FIGS. 2 to 5 illustrate a modulator in accordance with the present invention which comprises an optical fibre with a waveguide of active material in optical communication with the fibre. An optical fibre 2 has a section of the cladding 6 removed in an area where it is desired to locate a waveguide 10 of active material. The section of cladding 6 may be removed by forming the optical fibre 2 into a gentle curve and then polishing away the cladding. Ideally, sufficient cladding 6 should be removed so as to expose the surface of the core 4. However, in view of the relatively small dimensions involved (the core 4 usually being about 10 microns in diameter) a small thickness of the cladding 6 is usually maintained where the waveguide of active medium is to be formed. This can be seen from the cross-sectional views shown in FIGS. 3 and 5. A waveguide of active material is then formed in this area of reduced thickness so as to lie in a tail of the optical field of the optical fibre 2. The waveguide of active material may be formed by, for example, sputtering or vapour deposition.

Figure 2:
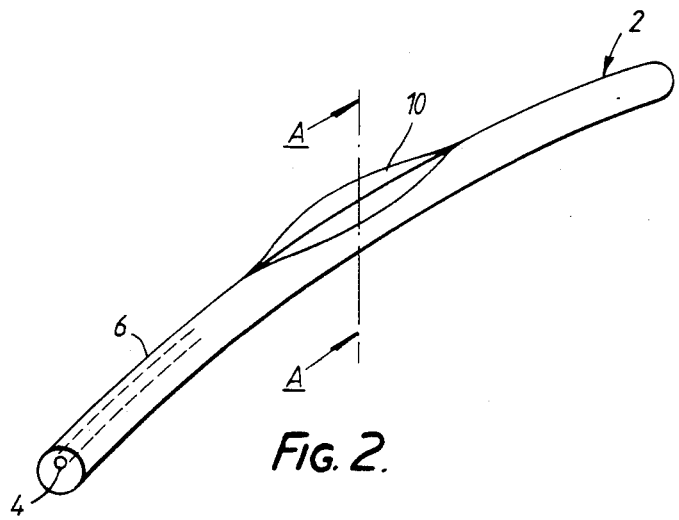
FIG. 2 illustrates one embodiment of a modulator in accordance with the present invention.
Figure 3:
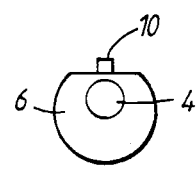
FIG. 3 illustrates a cross-sectional view through the line A—A shown in FIG. 2.

In the embodiment of FIGS. 2 and 3 the waveguide 10 is formed as a relatively thin stripe of active material. Typically the waveguide 10 will have a width of approximately 2 to 5 $\mu$m and a thickness of approximately 1 to 2 $\mu$m. The waveguide 10 is formed such that its longitudinal axis is substantially parallel to the axis of the core 4. Alternatively the waveguide 10 may be formed as a very thin slab of active material, typically of $\lesssim 1\mu$m thickness (not shown). By forming the waveguide 10 to such dimensions the waveguide 10 will have well defined modes which can be guided within it.

A mode of a guiding structure, such as the core 4 or waveguide 10, is an electromagnetic field distribution that travels down the guiding structure with no (or very slow) variation with propogation. Most structures will guide a number of number of modes, and any guided field distribution can then be described as a sum of such modes. Generally, modes exist over a range of wavelengths and the choice of modes for a given wavelength and a given guiding structure is normally unique.

Figure 7:
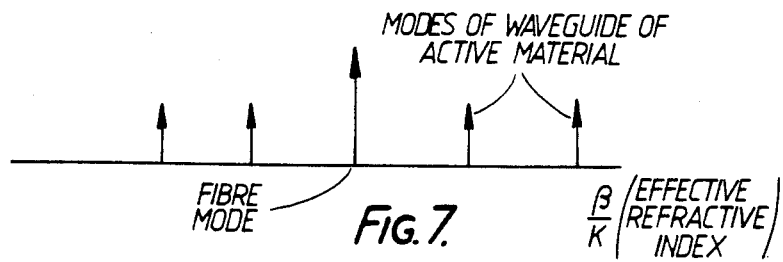
FIG. 7 is a diagram showing the modes of the optical fibre and the waveguide of active material of a modulator in accordance with the present invention.

The core 4 of the optical fibre 2 normally comprises silica glass which is a monomode material. Although the modes of the waveguide 10 of the active material must straddle the mode of the core 4 because of the respective refractive indices of the materials used, significant power from electromagnetic radiation propagating along the optical fibre 2, such as light from a laser source, will not be lost from the mode of the core 4 into the waveguide 10 provided that the separation in effective refractive index between the core 4 of the optical fibre 2 and any mode in the waveguide 10 of active material is equal to or greater than $\lambda/L$, where $\lambda$ is the wavelength of the electromagnetic radiation in the mode of the core of the optical fibre and L is the length of the effective portion of the waveguide 10 of active material. The effective portion of the waveguide 10 is that portion which interacts with the mode in the core 4 of the optical fibre 2. This separation of the fibre mode and the waveguide modes can be seen in FIG. 7.

Hence, if the dimensions of the waveguide 10 are controlled carefully a modulator can be achieved which exhibits very low propagation losses when compared to known devices as the modes in the waveguide 10 can be arranged to be separated from the mode of the core 4 of the optical fibre 2 by at least $\lambda/L$, and preferably, by several magnitudes of $\lambda/L$.

Figure 4:
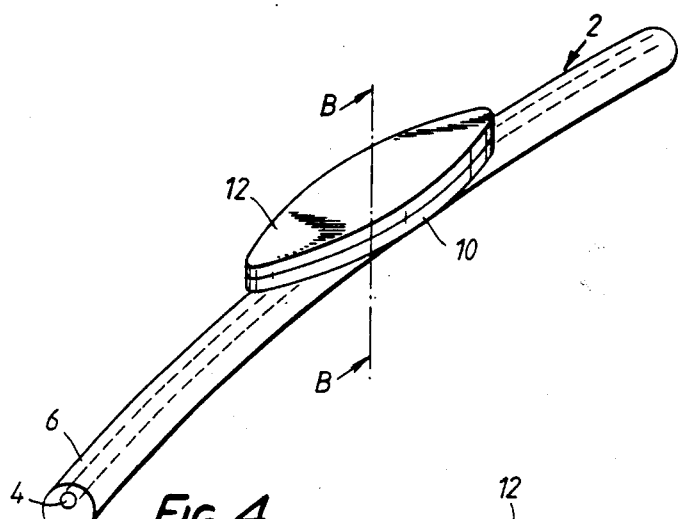
FIG. 4 illustrates a further embodiment of a modulator in accordance with the present invention.
Figure 5:
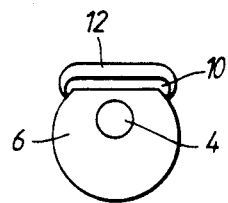
FIG. 5 illustrates a cross-sectional view through the line B—B shown in FIG. 4.

The required separation of the mode of the core 4 to any mode in the waveguide may also be achieved by forming a waveguide which does not guide any mode. A modulator incorporating such a waveguide is shown in the embodiment of FIGS. 4 and 5.

In this embodiment the waveguide 10 of active material is formed as a slab and is provided with a layer 12 of backing medium. The backing medium for the layer 12 is chosen such that its refractive index is substantially lower than the refractive index of the core 4 of the optical fibre 2. The relationship between the refractive indices of the component layers for a typical structure as shown in FIGS. 4 and 5 can be seen in FIG. 6 in which:

$n_1$ is the refractive index of the cladding 6
$n_2$ is the refractive index of the core 4
$n_3$ is the refractive index of the waveguide 10
$n_4$ is the refractive index of the layer 12 and
t is the thickness of the slab of active material forming the waveguide 10.

Figure 6:
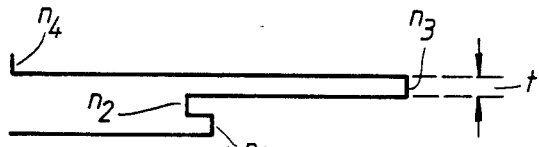
FIG. 6 is a diagram showing the refractive indicies for the structure shown in FIGS. 4 and 5.

It can be seen from FIG. 6 that the refractive index $n_4$ of the layer 12 of backing medium is substantially less than the refractive index $n_2$ of the core 4 of the optical fibre 2.

The layer 12 of backing medium may comprise a layer of metal or alternatively the backing medium may be air. The asymmetry of the refractive indices means that the waveguide 10 in combination with the layer 12 does not guide any mode in spite of the high refractive index of the waveguide 10 in relation to the refractive index of the core 4. As the waveguide 10 does not guide any mode no power can be lost to it from any electromagnetic radiation conveyed by the core 4 of the optical fibre 2 and hence, a modulator with low propagation losses is achieved.

With the proposed modulators the losses from the fibre into the waveguide are not dependent upon the refractive index of the material used to form the waveguide and hence a greater variety of materials, such as, for example, PLZT, Barium Titanate, Bismuth Silicon Oxide can be used to form the waveguide.

The modulator may be provided with a pair of electrodes (not shown) to which a voltage may be applied so as to provide an electric field within the active material forming the waveguide 10.

Although the present invention has been described with respect to specific embodiments thereof, it is to be understood that modifications and variations can be made within the scope of the invention.

I claim:

1. A modulator for electromagnetic radiation, the modulator comprising an optical fibre for conveying electromagnetic radiation, and a waveguide of active material, in optical communication with the optical fibre and responsive to an applied field for modulating electromagnetic radiation in the optical fibre, wherein the waveguide of active material is dimensioned to provide a propogation constant separated from that of the optical fibre mode by an amount equal to or greater than $\lambda/L$ where $\lambda$ is the wavelength of the electromagnetic radiation in the mode of the optical fibre and L is the length of the effective portion of the waveguide of active material, whereby propagation losses from the optical fibre into the waveguide are minimized.

2. A modulator according to claim 1 wherein the waveguide comprises a stripe of active material, the longitudinal axis of the stripe of active material being arranged substantially parallel to the longitudinal axis of the optical fibre.

3. A modulator according to claim 1 wherein the waveguide comprises a slab of active material.

4. A modulator according to any one of claims 1 to 3 wherein the waveguide of active material comprises a backing medium, the backing medium having a refractive index lower than the refractive index of the optical fibre.

5. A modulator according to claim 4 wherein the backing medium comprises air.

6. A modulator according to claim 4 wherein the backing medium comprises a metal layer.

7. A modulator according to claim 4 wherein the dimensions of the waveguide of active material and the refractive index of the backing medium are arranged such that there is no mode in the waveguide of active material.

8. A modulator according to any one of claims 1 to 3 wherein the active material comprises lithium niobate.

9. A modulator according to any one of claims 1 to 3 wherein the active material comprises Lanthanum doped lead zirconate titanate.

10. A modulator according to any one of claims 1 to 3 comprising a pair of electrodes for providing an electric field within the waveguide of active material.

* * * * *